United States Patent
Thetford

(10) Patent No.: US 8,168,713 B2
(45) Date of Patent: May 1, 2012

(54) DISPERSANTS AND COMPOSITIONS THEREOF

(75) Inventor: Dean Thetford, Norden (GB)

(73) Assignee: Lubrizol Limited, Hazelwood, Derby (GB)

( * ) Notice: Subject to any disclaimer, the term of this patent is extended or adjusted under 35 U.S.C. 154(b) by 964 days.

(21) Appl. No.: 11/913,240

(22) PCT Filed: May 1, 2006

(86) PCT No.: PCT/US2006/016737
§ 371 (c)(1),
(2), (4) Date: Oct. 31, 2007

(87) PCT Pub. No.: WO2006/124264
PCT Pub. Date: Nov. 23, 2006

(65) Prior Publication Data
US 2009/0131555 A1   May 21, 2009

Related U.S. Application Data

(60) Provisional application No. 60/680,347, filed on May 12, 2005.

(51) Int. Cl.
*C08K 5/16* (2006.01)
*C08G 69/02* (2006.01)
*C08G 69/40* (2006.01)

(52) U.S. Cl. ........ 524/538; 524/606; 524/608; 524/612; 516/203

(58) Field of Classification Search .................. 524/217, 524/210, 612, 538, 539, 606, 608; 516/203
See application file for complete search history.

(56) References Cited

U.S. PATENT DOCUMENTS

| | | | |
|---|---|---|---|
| 4,865,621 A * | 9/1989 | Sung | 44/419 |
| 6,197,877 B1 * | 3/2001 | Thetford et al. | 524/599 |
| 7,442,327 B2 * | 10/2008 | Thetford et al. | 252/500 |
| 7,671,119 B2 * | 3/2010 | Thetford | 524/217 |
| 7,767,750 B2 * | 8/2010 | Thetford | 524/538 |
| 2003/0171485 A1 * | 9/2003 | Catridge et al. | 524/555 |
| 2003/0181544 A1 * | 9/2003 | Thetford et al. | 523/160 |
| 2004/0116568 A1 * | 6/2004 | Thetford et al. | 524/306 |
| 2005/0084466 A1 * | 4/2005 | Mullay et al. | 424/70.11 |
| 2008/0281039 A1 * | 11/2008 | Thetford et al. | 524/607 |

FOREIGN PATENT DOCUMENTS

| | | |
|---|---|---|
| EP | 0359034 A1 | 3/1990 |
| WO | 00/20520 A1 | 4/2000 |
| WO | 2005/010109 A2 | 2/2005 |
| WO | 2006/068812 A1 | 6/2006 |

* cited by examiner

*Primary Examiner* — Mark Eashoo
*Assistant Examiner* — Michael A Salvitti
(74) *Attorney, Agent, or Firm* — Samuel B. Laferty

(57) ABSTRACT

The present invention provides a dispersant of Formula (1): $E-O-(Y)_x-T-NR'-A-Z-W_{0-v}$, and salts thereof, wherein E is R or $R-NR'-T-$; R is H or $C_{1-50}$-optionally substituted hydrocarbyl; R' is a residue of an optionally substituted alkyl (meth)acrylate or (meth)acrylamide, or a residue of an epoxide, or a $C_{1-8}$-optionally substituted hydrocarbyl group; Y is $C_{2-4}$-alkyleneoxy; T is $C_{2-4}$ alkylene; A is the residue of a dibasic acid or anhydride thereof; Z is the residue of a polyamine and/or polyimine; W is the residue of an oxide, urea or dibasic acid or anhydride thereof; x is from 2 to 90; and v represents an integer variable. The invention further provides a composition comprising a particulate solid, an organic medium and/or water and the dispersant.

17 Claims, No Drawings

DISPERSANTS AND COMPOSITIONS THEREOF

CROSS REFERENCE

This application claims priority from PCT Application Serial No. PCT/US2006/16737 filed on May 1, 2006, which claims the benefit of U.S. Provisional Application No. 60/680,347 filed on May 12, 2005.

FIELD OF INVENTION

The present invention relates to a novel class of dispersants; and compositions comprising said dispersants, a particulate solid and an organic medium. The invention further relates to the use of the dispersants in media, such as inks, millbases, plastics and paints.

BACKGROUND OF THE INVENTION

Many formulations such as inks, paints, mill-bases and plastics materials require effective dispersants for uniformly distributing a particulate solid in an organic medium. The organic medium may vary from a polar to non-polar organic medium. Dispersants containing terminal basic groups such as poly(lower alkylene)imine chains are well known and are generally prepared by reaction of the polyimine with polyester chains containing terminal acid groups, the reaction results in a mixture of amide and salt forms.

U.S. Pat. No. 4,224,212 discloses dispersants comprising a polyester derived from a hydroxycarboxylic acid with at least 8 carbon atoms reacted with a poly(loweralkylene)imine. The dispersants are effective in non-polar medium such as aliphatic solvents and plastics. However, the dispersants have limited performance in a polar medium.

European Patent Application EP 208041 A discloses dispersants with a polyester derived from ε-caprolactone reacted with a poly(loweralkylene)imine. The dispersants are particularly effective in more polar medium such as ketones and esters. However, the dispersants have limited performance in a non-polar medium.

U.S. Pat. No. 4,865,621 discloses motor fuel compositions comprising the reaction product of a dibasic acid anhydride, a polyoxyalkylene monoamine and a hydrocarbyl polyamine having a number average molecular weight of up to 1343.

However, U.S. Patent Application 60/637937 and PCT. Application WO 05/010109 A discloses dispersants with acceptable performance in a polar and a non-polar organic medium. However, the dispersants have poor flocculation resistance in reduced shades (coloured paint being let down into a white base paint) and/or storage stability in media, such as millbases and paints.

Therefore, it would be advantageous to have a dispersant with acceptable performance in both a polar and a non-polar organic medium and said dispersant having acceptable flocculation resistance and/or storage stability.

SUMMARY OF THE INVENTION

It has been found that certain dispersants show excellent ability to disperse a particulate solid in a range of organic media, particularly polar organic media and including water.

Thus, according to the present invention there is provided a dispersant comprising a compound of Formula (1) and salts thereof:

$$E\text{—}O\text{—}(Y)_x\text{-}T\text{-}NR'\text{-}A\text{-}Z\text{—}W_{0\text{-}v} \qquad \text{Formula (1)}$$

wherein

E is R or R—NR'-T-;

R is H or $C_{1\text{-}50}$-optionally substituted hydrocarbyl;

R' is a residue of an optionally substituted alkyl (meth)acrylate or (meth)acrylamide, or a residue of an epoxide, or a $C_{1\text{-}8}$-optionally substituted hydrocarbyl group;

Y is $C_{2\text{-}4}$-alkyleneoxy;

T is $C_{2\text{-}4}$ alkylene;

A is the residue of a dibasic acid or anhydride thereof;

Z is the residue of a polyamine and/or polyimine;

W is the residue of an oxide, urea or dibasic acid or anhydride thereof;

x is from 2 to 90; and (0-v) means from a value of 0 to v, where v represents the maximum available number of amino and/or imino groups in Z which does not carry the group E-O—$(Y)_x$-T-NR'-A-.

In one embodiment, the invention further provides a composition comprising a particulate solid, an organic medium and/or water and a compound of Formula (1) and salts thereof.

DETAILED DESCRIPTION OF THE INVENTION

The present invention provides a dispersant and/or a composition as defined above.

In one embodiment, the group E-O—$(Y)_x$-T-NR'-A- includes the groups R—O—$(Y)_x$-T-NR'-A-, R—NR'-T-O—$(Y)_x$-T-NR'-A-, or mixtures thereof.

Since Z is the residue of a polyamine and/or polyimine, in one embodiment there may be 2 or more than 2 groups E-O—$(Y)_x$-T-NR'-A- attached to Z and these may be the same or different.

In one embodiment, the polyoxyalkylene residue is derived from a diamine, there is provided a dispersant and/or composition comprising a particulate solid, an organic medium and a compound of Formula (1a):

$$R\text{—}NR'\text{-}T\text{-}O\text{—}(Y)_x\text{-}T\text{-}NR'\text{-}A\text{-}Z\text{—}W_{0\text{-}v} \qquad \text{Formula (1a)}$$

wherein

R is $C_{1\text{-}50}$-optionally substituted hydrocarbyl; or R is R"C=O (an acyl group where R" is alkyl or aryl); or is the residue of an optionally substituted alkyl (meth)acrylate or (meth)acrylamide, or the residue of an epoxide;

R' is the residue of an optionally substituted alkyl (meth)acrylate or (meth)acrylamide, or the residue of an epoxide or a $C_{1\text{-}8}$-optionally substituted hydrocarbyl; or the residue of an epoxide;

Y is $C_{2\text{-}4}$-alkyleneoxy;

T is $C_{2\text{-}4}$ alkylene;

A is the residue of a dibasic acid or anhydride thereof;

Z is the residue of a polyamine and/or polyimine;

W is the residue of an oxide, urea or dibasic acid or anhydride thereof;

x is from 2 to 90; and v represents the maximum available number of amino and/or imino groups in Z which does not carry the group R—NR'-T-O—$(Y)_x$-T-NR'-A-.

In one embodiment, the polyoxyalkylene residue is derived from a monoamine, there is provided a dispersant and/or composition comprising a particulate solid, an organic medium and a compound of Formula (1b):

$$R\text{—}O\text{—}(Y)_x\text{-}T\text{-}NR'\text{-}A\text{-}Z\text{—}W_{0\text{-}v} \qquad \text{Formula (1b)}$$

wherein

R is H or $C_{1\text{-}50}$-optionally substituted hydrocarbyl, or R is R"C=O (an acyl group where R" is alkyl or aryl); or is the residue of an optionally substituted alkyl (meth)acrylate or (meth)acrylamide, or the residue of an epoxide;

R' is a residue of an optionally substituted alkyl (meth) acrylate or (meth)acrylamide, or a residue of an epoxide, or a $C_{1-8}$-optionally substituted hydrocarbyl group;

Y is $C_{2-4}$-alkyleneoxy;

T is $C_{2-4}$ alkylene;

A is the residue of a dibasic acid or anhydride thereof;

Z is the residue of a polyamine and/or polyimine;

W is the residue of an oxide, urea or dibasic acid or anhydride thereof;

x is from 2 to 90; and v represents the maximum available number of amino and/or imino groups in Z which does not carry the group R—O—$(Y)_x$-T-NR'-A-.

In one embodiment, R is a hydrocarbyl including aryl, aralkyl, alkaryl, cycloalkyl or alkyl, which may be linear or branched, or mixtures thereof. In one embodiment, R is aryl including naphthyl or phenyl. In one embodiment, R is aralkyl including 2-phenylethyl or benzyl. In one embodiment, R is alkaryl including octyl phenyl or nonyl phenyl. In one embodiment, R is cycloalkyl including $C_{3-8}$-cycloalkyl such as cyclopropyl or cyclohexyl.

R may be an optionally branched alkyl, such as $C_{1-36}$ or $C_{1-30}$ optionally branched alkyl. The group RO— may thus be the residue of an alcohol such as methanol, ethanol, n-propanol, n-butanol, n-hexanol, n-octanol, n-decanol, n-dodecanol, n-tetradecanol, n-hexadecanol, n-octadecanol, isopropanol, isobutanol, tert-butanol, 2-ethylbutanol, 2-ethylhexanol, 3-heptanol, 3,5,5-trimethylhexanol, 3,7-dimethyloctanol and the so-called Guerbet alcohols. Guerbet alcohols are commercially available under the trade name Isofol™ (ex. Condea GmbH) including mixtures thereof. Specific examples of Guerbet alcohols are Isofol™ 12, 14T, 16, 18T, 18E, 20, 24, 28, 32, 32T and 36.

In one embodiment, R is $C_{1-6}$-alkyl and in another embodiment R is $C_{1-4}$-alkyl, such as methyl. When R is substituted hydrocarbyl, the substituent may be $C_{1-10}$-alkoxy, carbonyl, sulphonyl, carbamoyl, sulphamoyl, halogen, nitrile, ureido, urethane or ester (i.e., —COO— or —OCO—). Typically R is unsubstituted.

The group R' includes the residue of a (meth)acrylate, a (meth)acrylamide or mixtures thereof. Compounds of this type are commercially available. Specific examples include alkyl (meth)acrylates such as methyl acrylate, ethyl acrylate, propyl acrylate butyl acrylate, hexyl acrylate, isooctyl acrylate, lauryl acrylate, methoxyethyl acrylate, phenoxyethyl acrylate, stearyl acrylate, optionally quaternised dimethylaminoethyl acrylate, optionally quaternised diethylaminoethyl acrylate, hydroxyethyl acrylate, hydroxylpropyl acrylate or mixtures thereof. Quaternising counterion includes halides, hydroxides, alkyl sulphate, such as methyl sulphated, or mixtures thereof. In one embodiment, the methacrylate equivalents of the acrylates described above may also be useful.

When R is a residue of an epoxide, R may be the same as R defined above or R'.

Also, group R' may also be a residue of an epoxide, such as ethylene oxide, propylene oxide, butylene oxide, styrene oxide or mixtures thereof. Also, group R' may also be $C_{1-8}$ hydrocarbyl prepared from alkyl halides, aralkyl halides, such as benzyl chloride. In one embodiment, R' is a residue of an optionally substituted alkyl (meth)acrylate or (meth)acrylamide, or a $C_{1-8}$-optionally substituted hydrocarbyl group. In one embodiment R' is other than a residue of an epoxide. In one embodiment, R" contains not greater than 30 carbon atoms as disclosed hereinbefore for R.

R" in one embodiment may be the residue of a linear or branched, saturated or unsaturated optionally substituted carboxylic acid such as methoxy-acetic acid, propionic acid, butyric acid, hexanoic acid, octanoic acid, lauric acid, dodecanoic acid, stearic acid, 2-ethyl butyric acid, 2-ethyl hexanoic acid, 2-butyl octanoic acid, 2-hexyl decanoic acid, 2-octyl decanoic acid and 2-decyl tetra decanoic acid. Branched alkyl carboxylic acids of this type are also available under the trade name Isocarb™ (ex Condea GmbH) and specific examples are Isocarb™ 12, 16, 20, 28, 32, 34T and 36.

When R" is substituted, the substituent may be one or more ether groups or two or more ether groups. Thus, R"—CO— may be the residue of an Akypo™ carboxylic acid (ex Kao Chem GmbH). Specific examples are Akypo™ LF1, Akypo™ LF2, Akypo™ RLM 25, Akypo™ RLM 45 CA, Akypo™ RO 20 VG and Akypo™ RO 50 VG.

When Y is $C_{3-4}$-alkyleneoxy and the chain represented by $(Y)_x$ contains ethyleneoxy (—$CH_2CH_2O$—), the structure of $(Y)_x$ may be random or block. In one embodiment, the structure of $(Y)_x$ is block. In one embodiment, the number of ethyleneoxy units on Y is 0. Each Y may be —$CH_2CH_2CH_2CH_2O$—, —$CH_2CH(CH_3)O$— or —$CH_2$—$CH(CH_2$—$CH_3)$—O—.

In one embodiment, the compound of Formula (1 and/or 1a) may be when Y is a —$CH_3CH(CH_3)O$— group and the chain may be represented by $(Y)_x$ containing up to 75% ethyleneoxy repeat units. T includes $C_{3-4}$-alkylene and in one embodiment —$CH_2CH(CH_3)$—. T may also be —$CH_2CH(CH_3)$— when Y is —$CH_2CH(CH_3)O$—. T in several embodiments may be a $C_{3-4}$-alkylene, or —$CH_2CH(CH_3)$— or —$CH_2CH_2CH_2$—.

The group R—O—$(Y)_x$-T-NR'— may include the residue of a polyalkyleneoxide monoalkyl ether monoamine or mixtures thereof. Compounds of this type are commercially available as the Jeffamine™ M-series of monoamines from Huntsman Corporation. Specific examples of Jeffamine™ amines are M-600 (9,0,600), M-1000 (3,18,1000), M-2005 (32,2,2000) and M-2070 (10, 31, 2000). The figures in parentheses are approximate repeat units of propylene oxide, ethylene oxide and number-average molecular weight respectively.

The group RNR'-T-O—$(Y)_x$-T-NR'— may be the residue of a polyalkyleneoxide diamine or mixtures thereof. Compounds of this type are commercially available as the Jeffamine™ D or ED-series of diamines from Huntsman Corporation. Specific examples of Jeffamine™ diamines are D-230 (3, 0, 230), D-400 (6, 0, 400), D-2000 (33, 0, 2000), D-4000 (68, 0, 4000), ED-600 (3.6, 9, 600), ED-900 (2.5, 15.5, 900) and ED2003 (6, 39, 2000). The figures in parentheses are approximate repeat units of propylene oxide, ethylene oxide and number-average molecular weight respectively.

When Z is the residue of a polyamine, examples of the polyamine include polyvinylamine, alkylenepolyamine (typically made from ethylene dichloride and ethylene diamine and/or ammonia) or polyallylamine. Polyallylamine and poly(N-alky)allylamines of differing molecular weight are commercially available from Nitto Boseki. Polyvinylamine of differing molecular weight are available from Mitsubishi Kasei.

When Z is the residue of a polyimine or mixtures thereof, the polyimine may be a poly ($C_{2-6}$-alkyleneimine). A specific example includes polyethyleneimine (PEI). The polyimine may be linear or especially branched. Linear polyethyleneimine may be prepared by the hydrolysis of poly(N-acyl) alkyleneimines as described, for example, by Takeo Saegusa et al. in Macromolecules, 1972, Vol 5, page 4470. Branched polyethyleneimines of differing molecular weight are commercially available from BASF and Nippon Shokubai. Polypropyleneimine dendrimers are commercially available from DSM Fine Chemicals and poly(amidoamine) dendrimers are available as "Starburst" dendrimers from Aldrich Chemical Company.

Other useful types of polyamine mixtures are those resulting from stripping of the above-described polyamine mixtures to leave as residue what is often termed "polyamine bottoms". In general, alkylenepolyamine bottoms may be characterised as having less than two, usually less than 1% (by weight) material boiling below about 200° C. A typical sample of such ethylene polyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably DETA), 0.72% TETA, 21.74% tetraethylene pentamine and 76.61% pentaethylenehexamine and higher (by weight). These alkylenepolyamine bottoms include cyclic condensation products such as piperazine and higher analogs of diethylenetriamine or triethylenetetramine.

The number average molecular weight of the polyamine or polyimine in one embodiment is from 300 to 650,000; 500 to 600,000; 600 to 100,000; or 1200 to 70,000. In the case of polyethyleneimine, the number-average molecular weight in one embodiment is not less than 600, not less than 1200 or not less than 1800.

The residue of dibasic acid represented by A may be derived from any dibasic acid of formula HOOC—B—COOH or anhydride thereof wherein B is a direct bond or a divalent organic moiety containing from 1 to 20 carbon atoms. B may be aromatic, hetero aromatic, alicyclic or aliphatic which may be optionally substituted. When B is aliphatic containing two or more carbon atoms, it may be linear or branched, saturated or unsaturated. In one embodiment, B is unsubstituted. In several embodiments, B contains not greater than 12 or not greater than 8 carbon atoms.

When B is aromatic, it includes phenylene; when B is alicyclic it includes cyclohexylene and when B is aliphatic it includes alkylene. Examples of suitable dibasic acids or higher acids include terephthalic, tetrahydrophthalic, methyl tetrahydrophthalic, hexahydrophthalic, methyl hexahydrophthalic, trimellitic, $C_{1-20}$-alkenyl or alkyl succinic and especially maleic, malonic, succinic and phthalic acids.

In one embodiment, suitable dibasic acids for A and/or W may be selected from the group consisting of maleic acid, malonic acid, succinic and phthalic acid, maleic anhydride, glutaric anhydride, succinic anhydride and phthalic anhydride. In several embodiments, suitable anhydrides include are glutaric anhydrides, succinic anhydrides, phthalic anhydrides or mixtures thereof.

Mixtures of dibasic acids or anhydrides thereof may be used. Thus, A may be the residue of one or more than one different dibasic acid or anhydride. However, in one embodiment, A is the residue of a single dibasic acid or anhydride. Similarly, W may be the residue of one or more than one different dibasic acid or anhydride. In one embodiment W is the residue of a single dibasic acid or anhydride. In one embodiment, both A and W are the residue of the same dibasic acid or anhydride. In one embodiment, both A and W are the residue of a different dibasic acid or anhydride. In one embodiment, A and/or W is the residue of succinic anhydride.

When W is the residue of an oxide any of the amino or imino groups in Z which do not carry the group E-O—$(Y)_x$-T-NR'-A- may be converted to a N-oxide by reaction with oxygen (including air) or a peroxide such as hydrogen peroxide or ammonium persulphate. In one embodiment the compound of formula 1 may be post-treated with an oxidizing agent (see above) to convert some and/or all of the amino groups to the N-oxide.

Similarly, when W is the residue of urea, the number of free amino and/or imino groups in Z which are reacted with urea may vary over wide limits up to the maximum number of amino or imino groups which do not carry the group E-O—$(Y)_x$-T-NR'-A-.

In one embodiment, W is the residue of a dibasic acid or anhydride, and that the majority (at least 50%, or at least 75%, or at least 90% to 99%) of free amino or imino groups in Z which do not carry the group E-O—$(Y)_x$-T-NR'-A- is reacted with the dibasic acid or anhydride represented by W.

In one embodiment, the polyamine or polyimine represented by Z carries 2 or more groups E-O—$(Y)_x$-T-NR'-A-. The groups which may be the same or different. Dispersants of this type may be conveniently represented by Formula (2):

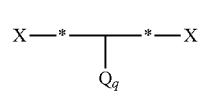

Formula (2)

wherein
X-*-*-X represents the polyamine and/or polyimine;
Q is the chain E-O—$(Y)_x$-T-NR'-A-; and
q is from 2 to 2000.

In one embodiment, the polyamine or polyimine represented by Z carries two or more different polymer chains and is represented by formula 2a:

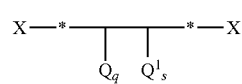

Formula 2a wherein
X-*-*-X and Q are as defined hereinbefore; and
$Q^1$ represents a polyester and/or polyamide chain of formula $R^1$-G-$(M)_m$-;
$R^1$ is hydrogen or $C_{1-50}$-optionally substituted hydrocarbyl;
G is a divalent bond or carbonyl;
M is the residue of one or more amino carboxylic acids, one or more hydroxy carboxylic acids, one or more lactones of hydroxycarboxylic acids, or mixtures thereof;
q and s are positive integers greater than zero, in one embodiment q+s is from 2 to 2000; and
m is a positive integer from 2 to 100. In one embodiment the ratio of q to s is from 6:1 to 1:6.

In one embodiment, G is carbonyl and $R^1$-G- is the residue of a $C_{1-50}$-optionally substituted hydrocarbyl carboxylic acid and especially a $C_{1-50}$-optionally substituted aliphatic acid where the aliphatic group may be saturated or unsaturated, linear or branched.

In one embodiment, $R^1$ contains not greater than 30 carbon atoms as disclosed hereinbefore for R. $R^1$—CO— may also be the residue of a linear or branched, saturated or unsaturated optionally substituted carboxylic acid such as methoxy-acetic acid, propionic acid, butyric acid, hexanoic acid, octanoic acid, lauric acid, dodecanoic acid, stearic acid, 2-ethyl butyric acid, 2-ethyl hexanoic acid, 2-butyl octanoic acid, 2-hexyl decanoic acid, 2-octyl decanoic acid and 2-decyl tetra decanoic acid. Branched alkyl carboxylic acids of this type are also available under the trade name Isocarb™ (ex Condea GmbH) and specific examples are Isocarb™ 12, 16, 20, 28, 32, 34T and 36.

When $R^1$ is substituted, the substituent may be one or more ether groups or two or more ether groups. Thus, $R^1$—CO— may be the residue of an Akypo™ carboxylic acid (ex Kao Chem GmbH). Specific examples are Akypo™ LF1, Akypo™ LF2, Akypo™ RLM 25, Akypo™ RLM 45 CA, Akypo™ RO 20 VG and Alcypo™ RO 50 VG.

The amino carboxylic acid from which M is obtainable includes amino-$C_{2-20}$-alk(en)ylene carboxylic acid or an amino $C_{1-20}$-alkylene carboxylic acid. In one embodiment, the alk(en)ylene group contains not greater than 12 carbon atoms. Specific examples are 11-amino undecanoic acid, 6-amino caproic acid, 4-amino butyric acid, β-alanine or sarcosine.

The hydroxy carboxylic acid from which M is derivable includes a hydroxy-$C_{2-20}$-alkenylene carboxylic acid or a hydroxy-$C_{1-20}$ alkylene carboxylic acid. Specific examples of suitable hydroxy carboxylic acids are ricinoleic acid, 12-hydroxystearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, lactic acid or glycolic acid.

M is also derivable from a lactone such as β-propiolactone, optionally $C_{1-6}$-alkyl substituted ε-caprolactone and optionally $C_{1-6}$-alkyl substituted δ-valerolactone. Specific examples of substitutents for ε-caprolactone and/or δ-valerolactone include 7-methyl-, 3-methyl-, 5-methyl-, 6-methyl-, 4-methyl-, 5-tetra-butyl-, 4,4,6-trimethyl- and 4,6,6-trimethyl.

As noted hereinbefore, the dispersant may be present in the form of a salt. Where the dispersant contains a carboxylic acid group the salt may be that of an alkali metal such as lithium, potassium or sodium. Alternatively, the salt may be formed with ammonia, an amine or quaternary ammonium cation. Examples of amines are methylamine, diethylamine, ethanolamine, diethanolamine, hexylamine, 2-ethylhexylamine and octadecylamine. The quaternary ammonium cation may be a quaternary ammonium cation or a benzalkonium cation. The quaternary ammonium cation in one embodiment contains one or two alkyl groups containing from 6 to 20 carbon atoms. Examples of quaternary ammonium cations are tetraethyl ammonium, N-octadecyl-N,N,N-trimethyl ammonium; N,N-didodecyl-N,N-dimethyl ammonium, N-benzyl-N,N,N-trimethyl ammonium and N-benzyl-N-octadecyl-N,N-dimethyl ammonium cation.

In one embodiment, the dispersant containing a carboxylic acid group is in the form of a free acid.

The dispersant of formula 1 where v is zero may be in the form of a salt of a coloured acid. The coloured acid may be any anionic dyestuff such as sulphonated or carboxylated copper or nickel phthalocyanine containing on average 0.5 to 3 sulphonic acid groups per molecule or a disazo dyestuff containing a sulphonic acid and/or carboxylic acid group.

When v is zero some of the amine/imine groups in Z which do not carry the group E-O—$(Y)_x$-T-NR'-A- may be converted into substituted ammonium groups by reaction with an acid or quaternising agent. Suitable reagents for this purpose include mineral and strong acids such as hydrochloric acid, acetic acid, sulphuric acid, alkyl sulphonic acids, alkyl hydrogen sulphates or aryl sulphonic acids. Quaternising agents include compounds such as dimethyl sulphate, benzyl chloride, methyl chloride, methyl bromide, methyl iodide, and propane (or butane) sultone.

The compound of Formula (1) may be made by any method known to the art. A precursor to Formula (1) before reaction with polyamine and/or polyimine may be prepared by the processes described in U.S. Pat. No. 4,713,487 and EP 73545. The reaction with the polyamine and/or polyimine is carried out in one embodiment at a temperature of from 100° C. to 200° C. Under such conditions, the reaction results in a mixture of amide and salt forms rather than the salt form alone.

The reaction involving the dibasic acid or anhydride thereof is typically carried out in the presence of an organic diluent which is inert to the reactants. In one embodiment, the organic diluent is a solvent for the reactants. The organic diluent may be aromatic or aliphatic including halogenated derivatives. Examples are toluene, chlorobenzene, heptane and petroleum ether distillates. Typically, the reaction is carried out in the absence of an organic diluent.

When W is the residue of an oxide, the number of amino and/or imine groups in Z which do not carry the group E-O—$(Y)_x$-T-NR'-A- may vary over wide limits. Such dispersants are easily prepared by reacting dispersants containing free amino and/or imino groups with an oxidising compound such as oxygen (or air) or a peroxide such as hydrogen peroxide or ammonium persulphate. Similarly, when W is the residue of urea such dispersants may also be readily prepared by reacting any free amino and/or imino groups in Z which do not carry the group E-O—$(Y)_x$-T-NR'-A- with urea. In one embodiment, the reaction is carried out in an inert atmosphere at a temperature between 80° C. and 140° C.

In the specific case where W is the residue of a dibasic acid or anhydride thereof, the majority of amino and/or imino groups in Z which do not carry the group E-O—$(Y)_x$-T-NR'-A- is reacted with the dibasic acid or anhydride.

The particulate solid present in the composition may be any inorganic or organic solid material which is substantially insoluble in the organic medium. In one embodiment, the particulate solid is a pigment.

Examples of suitable solids are pigments for solvent inks; pigments, extenders and fillers for paints and plastics materials; disperse dyes; optical brightening agents and textile auxiliaries for solvent dyebaths, inks and other solvent application systems; solids for oil-based and inverse-emulsion drilling muds; dirt and solid particles in dry cleaning fluids; particulate ceramic materials; magnetic materials and magnetic recording media; fibres such as glass, steel, carbon and boron for composite materials, and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones and carbon blacks.

Inorganic solids include: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

Other useful solid materials include agrochemicals such as the fungicides flutriafen, carbendazim, chlorothalonil and mancozeb.

The organic medium present in the composition of the invention in one embodiment is a plastics material and in another embodiment an organic liquid. The organic liquid may be a non-polar or a polar organic liquid. By the term "polar" in relation to the organic liquid, it is meant that an organic liquid is capable of forming moderate to strong bonds as described in the article entitled "A Three Dimensional Approach to Solubility" by Crowley et. al. in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40, and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran. In one embodiment, solvents are alkanols, alkane carboxylic acids and esters of alkane carboxlic acids. In one embodiment, the present invention is suitable for organic liquids that are substantially non-soluble in an aqueous medium. Furthermore, a person skilled in the art will appreciate that small quantities of an aqueous medium (such as glycols, glycol ethers, glycol esters and alcohols) may be present in the organic liquids provided the overall organic liquid is substantially non-soluble in an aqueous medium.

Examples of organic liquids, which may be used as polar organic liquids are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the organic liquid comprises at least 0.1% by weight, or 1% by weight or more of a polar organic liquid based on the total organic liquid. The organic liquid optionally further comprises water. In one embodiment, the organic liquid is free of water.

When the organic liquid contains water, the amount present in several embodiments is not greater than 70%, or not greater than 50% or not greater than 40% by weight based on the amount of organic liquid.

The plastics material may be a thermoset resin or a thermoplastic resin. The thermosetting resins useful in this invention include resins which undergo a chemical reaction when heated, catalysed, or subject to UV radiation and become relatively infusible. Typical reactions in thermosetting resins include oxidation or unsaturated double bonds, reactions involving epoxy/amine, epoxy/carbonyl, epoxy/hydroxyl, polyisocyanate/hydroxy, amino resin/hydroxy moieties, free radical reactions or polyacrylate, cationic polymerization or epoxy resins and vinyl ether, condensation or silanol.

Polymers with hydroxy functionality (frequently polyols) are widely used in thermosetting system to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and biphenylmethane diisocyanates.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods.

If desired, the compositions may contain other ingredients, for example, resins (where these do not already constitute the organic medium), binders, fluidising agents anti-sedimentation agents, plasticisers, surfactants, anti-foamers, rheology modifiers, levelling agents, gloss modifiers and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the composition.

The composition of the present invention is particularly suited to liquid dispersions. In one embodiment, such dispersion compositions comprise:
(a) from 0.5 to 30 parts of a particulate solid;
(b) from 0.5 to 30 parts of a compound of Formula (1); and
(c) from 40 to 99 parts of an organic liquid and/or water;
wherein all parts are by weight and the amounts (a)+(b)+(c)=100.

In one embodiment, component a) comprises from 0.5 to 30 parts of a pigment and such dispersions are useful as (liquid) inks, paints and millbases.

If a composition is required comprising a particulate solid and a dispersant of Formula (1) in dry form, the organic liquid is typically volatile so that it may be readily removed from the particulate solid by a simple separation means such as evaporation. In one embodiment, the composition comprises the organic liquid.

If the dry composition consists essentially of the dispersant of Formula (1) and the particulate solid, it typically contains at least 0.2%, at least 0.5% or at least 1.0% dispersant of Formula (1) based on weight of the particulate solid. In one embodiment, the dry composition contains not greater than 100%, not greater than 50%, not greater than 20% or not greater than 10% by weight of dispersant of Formula (1) based on the weight of the particulate solid.

As disclosed hereinbefore, the compositions of the invention are suitable for preparing mill-bases wherein the particulate solid is milled in an organic liquid in the presence of a compound for Formula (1) and salts thereof.

Thus, according to a still further aspect of the invention, there is provided a mill-base comprising a particulate solid, an organic liquid and a compound of Formula (1) and salts thereof.

Typically, the mill-base contains from 20 to 70% by weight particulate solid based on the total weight of the mill-base. In one embodiment, the particulate solid is not less than 10 or not less than 20% by weight of the mill-base. Such mill-bases may optionally contain a binder added either before or after milling.

The binder is a polymeric material capable of binding the composition on volatilisation of the organic liquid.

Binders are polymeric materials including natural and synthetic materials. In one embodiment, binders include poly(meth)acrylates, polystyrenics, polyesters, polyurethanes, alkyds, polysaccharides such as cellulose, and natural proteins such as casein. In one embodiment, the binder is present in the composition at more than 100% based on the amount of particulate solid, more than 200%, more than 300% or more than 400%.

The amount of optional binder in the mill-base can vary over wide limits but is typically not less than 10%, and often not less than 20% by weight of the continuous/liquid phase of the mill-base. In one embodiment, the amount of binder is not greater than 50% or not greater than 40% by weight of the continuous/liquid phase of the mill-base.

The amount of dispersant in the mill-base is dependent on the amount of particulate solid but is typically from 0.5 to 5% by weight of the mill-base.

Dispersions and mill-bases made from the composition of the invention are particularly suitable for use in coatings and paints, especially high solids paints; inks, especially flexographic, gravure and screen inks; non-aqueous ceramic processes, especially tape-coating, doctor-blade, extrusion and injection moulding type processes; composites, cosmetics, adhesives and plastics materials.

As noted hereinbefore, many of the dispersants of Formulae (1) and (1a) are novel. Thus, according to a further aspect of the present invention, there is provided a paint or ink comprising a particulate solid, an organic liquid, a binder and a compound of Formulae (1), (1a) and (1b); and salts thereof.

According to a still further aspect of the invention, there is provided a compound of Formulae (1), (1a) and (1b); and salts thereof, wherein Z is a polyamine and/or polyimine having a number average molecular weight of not less than 1500 and where (0-v) is zero, e.g. the Formulae does not include oxides, urea or dibasic acids or anhydrides (W) added.

The invention is further illustrated by the following examples wherein all references to amounts are in parts by weight unless indicated to the contrary.

EXAMPLES

Example 1

Intermediate 1: Synthesis of 1:1 Polyetheramine:2-Hydroxyethyl Acrylate

2-Hydroxyethyl Acrylate (5.25 g 45.2 mmols, ex Aldrich), 2,6-di-tert-butyl-4-methylphenol (0.005 g) and a polyetheramine C12-C15 mixed fatty alcohol ended polypropoxylate amine of approx MW 1650 (100 g 45.2 mmols, as prepared in U.S. Pat. No. 5,094,667, 75 wt % actives) are stirred at 70° C. for 4 hours under an air atmosphere to give a clear, yellow liquid (105 g), IR showed no presence of an olefinic bond.

Intermediate 2: Synthesis of 1:1:1 Polyetheramine:2-Hydroxyethyl Acrylate:Succinic Anhydride Intermediate 1 (50 g 20.4 mmols) and succinic anhydride (2.04 g 20.4 mmols, ex Aldrich Batch No 31081-050) are stirred at 80° C. for 18 hours under a nitrogen atmosphere to give a clear yellow liquid (52 g), IR showed no presence of an anhydride group and the presence of a carbonyl amide (1659 $cm^{-1}$). Acid value of the mixture was measured as 24.4 mg KOH/g.

Dispersant 1

Polyethyleneimine SP200 (3.6 g 1 mmol, ex Nippon Shokubai MW 10000) is added to stirred intermediate 2 (52 g 20 mmols) at 80° C. under a nitrogen atmosphere. After 15 mins, the whole mixture is stirred at 120° C. for 6 hours under a nitrogen atmosphere to give a viscous amber gum (55 g). The acid value of the mixture was measured as 19.4 mg KOH/g. 20 g of this product was isolated.

Dispersant 2

A mixture of Dispersant 1 is further heated at 120° C. for 6 hours under a nitrogen atmosphere to give a viscous amber gum (35 g). The acid value of the mixture was measured as 17.2 mgKOH/g.

Examples 2-11

The process to Intermediate 1 was repeated except using starting materials indicated in Table 1 below in place of the polyetheramine and 2-hydroxyethylacrylate used in Example 1. The molar ratio of polyetheramine to acrylate is 1:1. Examples 2-11 are prepared using materials highlighted in the following table.

| Example | Intermediate | Polyetheramine | Acrylate |
|---|---|---|---|
| 2 | 3 | Jeffamine M2005 | 2-HEA |
| 3 | 4 | C12-C15 polypropoxylate amine MW 1650 | MeOPEG Ac |
| 4 | 5 | MeOPEG 350 polypropoxylate MW 1420 | 2-HEA |
| 5 | 6 | Jeffamine M2005 | 2-DMAEA |
| 6 | 7 | MeOPEG 350 polypropoxylate MW 1420 | 2-DMAEA |
| 7 | 8 | MeOPEG 350 polypropoxylate MW 1800 | EGMEA |
| 8 | 9 | Jeffamine M2005 | DEGMEA |
| 9 | 10 | C12-C15 polypropoxylate amine MW 1650 | DEAEA |
| 10 | 11 | C12-C15 polypropoxylate amine MW 1650 | DMAPA |
| 11 | 12 | C12-C15 polypropoxylate amine MW 1650 | DMAPMA |

Footnote to Table 1
2-HEA is 2-hydroxyethylacrylate ex Aldrich
MeOPEG Ac is polyethyleneglycol methyl ether acrylate approx Mn 454 ex Aldrich
2-DMAEA is 2-dimethylaminoethyl acrylate ex Aldrich
EGMEA is ethyleneglycol methyl ether acrylate ex Aldrich
DEGMEA is Diethyleneglycol methylethyl acrylate ex Aldrich
DEAEA is 2-Diethylaminoethyl acrylate ex Aldrich
DMAPA is 3-Dimethylaminopropyl acrylate
DMAPMA is 3-Dimethylaminopropyl methacrylamide Examples 12-21

The process to Intermediate 2 was repeated except using starting materials indicated in Table 2 below in place of the Intermediate 1 used in Example 1. The molar ratios of the components are shown below.

| Example | Intermediate | Intermediate*** | Anhydride | Molar Ratio |
|---|---|---|---|---|
| 12 | 13 | 3 | SUCCA | 1:1 |
| 13 | 14 | 4 | SUCCA | 1:1 |
| 14 | 15 | 5 | SUCCA | 1:1 |
| 15 | 16 | 6 | SUCCA | 1:1 |
| 16 | 17 | 7 | SUCCA | 1:1 |
| 17 | 18 | 8 | SUCCA | 1:1 |
| 18 | 19 | 9 | SUCCA | 1:1 |
| 19 | 20 | 10 | SUCCA | 1:1 |
| 20 | 21 | 11 | SUCCA | 1:1 |
| 21 | 22 | 12 | SUCCA | 1:1 |

Footnote to Table 2
Intermediate*** is reacted with SUCCA to form Dispersant
SUCCA is succinic anhydride ex Aldrich Examples 22-36

The process to Dispersants 1 and 2 was repeated except using starting materials indicated in Table 3 below in place of the Intermediate 2 and polyethyleneimine SP200 used in Example 1. The weight ratios of the components are as indicated in the table below.

| Example | Dispersant | Intermediate | PEI | Weight Ratio* | Acid Value (mg KOH/g) |
|---|---|---|---|---|---|
| 22 | 3 | 3 | SP200 | 11:1 | 16.1 |
| 23 | 4 | 4 | SP200 | 11:1 | 28 |
| 24 | 5 | 5 | SP200 | 11:1 | 15.5 |
| 25 | 6 | 6 | SP200 | 11:1 | 23.2 |
| 26 | 7 | 5 | SP200 | 17:1 | 30 |
| 27 | 8 | 8 | SP075 | 11:1 | 27 |
| 28 | 9 | 1 | SP200 | 11:1 | 16.3 |
| 29 | 10 | 8 | SP200 | 17:1 | 22 |
| 30 | 11 | 7 | SP050 | 15:1 | 19.5 |
| 31 | 12 | 9 | SP030 | 9:1 | 17.6 |
| 32 | 13 | 10 | PAA05 | 10:1 | 12.5 |
| 33 | 14 | 11 | SP075 | 5:1 | 17 |
| 34 | 15 | 12 | SP200 | 13:1 | 15.7 |
| 35 | 16 | 6 | SP200 | 11:1 | 12 |
| 36 | 17 | 6 | SP200 | 17:1 | 8 |

Footnote to Table 3
Weight Ratio* is the weight ratio of Intermediate to PEI

SP030, SP050 and SP075 are polyethylenimine with Mn 3000, 5000 and 7500 respectively, ex Nippon Shokubai
PAA 05 is polyallylamine with MW 5000, ex Nitto Boseki Co Ltd.

Comparative Example 1 is a poly(ε-caprolactone) end-capped with lauric acid and reacted with polyethyleneimine as described in U.S. Pat. No. 4,645,611.

Comparative Example 2 is mill base prepared in the absence of dispersant.

Comparative Example 3 is the same prepared in the same process as Dispersant 1 or 2, except 2-Hydroxyethyl Acrylate is not used.

Preparation of Mill-Bases

A series of magenta mill-bases are prepared utilising the various dispersants (Examples 1, 2 and 37-47) and Comparative Examples 1 and 2. The mill-bases are prepared by dissolving dispersant (0.45 g) in a solvent mixture of 7.55 g MPA:Butanol ratio of 4:1 (MPA=methoxypropylacetate). Glass beads (3 mm, 17 parts) and Monolite Rubine 3B (ex Heubach 2.0 parts) are added and the mixture was shaken on a horizontal shaker for 16 hours. The resulting dispersions were then assessed for fluidity using an arbitrary scale of A to E (good to bad). The milling grade obtained are:

| Example | Dispersant | Milling Grade |
|---|---|---|
| 1 | 1 | C |
| 1 | 2 | C |
| 37 | 3 | B/C |
| 38 | 4 | C/D |
| 39 | 5 | C |
| 40 | 6 | B |
| 41 | 7 | B/C |
| 42 | 8 | B |
| 43 | 9 | C |
| 44 | 10 | B/C |
| 45 | 11 | B/C |
| 46 | 13 | C/D |
| 47 | 17 | C |

-continued

| Example | Dispersant | Milling Grade |
|---|---|---|
| — | Comparitive Example 1 | C/D |
| — | Comparative Example 2 | E |

Flocculation Test

Examples are prepared by blending the mill-base (stainer) containing the dispersant (1 or 2) or Comparative Example 3 with a polyester white paint to make 1/10 colour/white reduction. The paint contains 10 g of polyester white, about 4.1 g of stainer and 2 g of xylene. The paint is then blended for homogeneity in a Skandex mill for 10 minutes, followed by 20 minutes on lab rollers. The blended paint is then tested on an Automatic K-Bar Coater (using K-Bar No. 4), prepared side by side drawdowns on coated black/white card. The Examples are allowed to air-dry for at least 30 minutes before placing in stove at 150° C. for 20 minutes. The gloss of the patterns is measured using a gloss meter set at 20° and 60° viewing angle as is the change in flocculation. The results obtained are summarised as follows:

| Example | Gloss 60° | Gloss 20° | Change Flocculation |
|---|---|---|---|
| Dispersant 1 | 90.1 | 69.3 | 1.18 |
| Dispersant 2 | 89.7 | 70.6 | 0.8 |
| Comparative Example 3** | 91.9 | 75.2 | 15.58 |

**Comparative Example 3 has poor separation and finger rub.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(i) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

(ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

(iii) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, or no more than one, non-hydrocarbon substituent will be present for every ten carbon atoms in the hydrocarbyl group; typically, there will be no non-hydrocarbon substituents in the hydrocarbyl group.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

What is claimed is:

1. A dispersant comprising a compound of Formula (1) and salts thereof:

$$E-O-(Y)_x-T-NR'-A-Z-W_{0-v} \quad \text{Formula (1)}$$

wherein optionally there may be more than 2 groups E—O—$(Y)_x$-T-NR'-A- attached to Z and these may be the same or different;

E is R or R—NR'-T-;

R is H or $C_{1-50}$-optionally substituted hydrocarbyl;

R' is a residue of an optionally substituted alkyl (meth)acrylate or (meth)acrylamide, or a residue of an epoxide, or a $C_{1-8}$- optionally substituted hydrocarbyl group;

Y is $C_{2-4}$-alkyleneoxy;

T is $C_{2-4}$ alkylene;

A is the residue of a dibasic acid or anhydride thereof;

Z is the residue of a polyamine and/or polyimine;

W is the residue of an oxide, urea or dibasic acid or anhydride thereof;

x is from 2 to 90; and (0-v) means a value from 0 to v, where v represents the maximum available number of amino and/or imino groups in Z which does not carry the group E—O—$(Y)_x$-T-NR'-A-.

2. A composition comprising a particulate solid, an organic medium and/or water and a compound of Formula (1) and salts thereof:

$$E-O-(Y)_x-T-NR'-A-Z-W_{0-v} \quad \text{Formula (1)}$$

wherein optionally there may be more than 2 groups E—O—$(Y)_x$-T-NR'-A- attached to Z and these may be the same or different;

E is R or R—NR'-T-;

R is H or $C_{1-50}$-optionally substituted hydrocarbyl;

R' is a residue of an optionally substituted alkyl (meth)acrylate or (meth)acrylamide, or a residue of an epoxide, or a $C_{1-8}$- optionally substituted hydrocarbyl group;

Y is $C_{2-4}$-alkyleneoxy;

T is $C_{2-4}$ alkylene;

W is the residue of a dibasic acid or anhydride thereof;

Z is the residue of a polyamine and/or polyimine;

W is the residue of an oxide, urea or dibasic acid or anhydride thereof;

x is from 2 to 90; and v represents the maximum available number of amino and/or imino groups in Z which does not carry the group E—O—$(Y)_x$-T-NR'-A-.

3. The dispersant as claimed in claim 1 wherein Y is $C_{3-4}$-alkyleneoxy.

4. The dispersant as claimed in claim 1 wherein Y is $C_{3-4}$-alkyleneoxy and the chain represented by $(Y)_x$ is —$CH_2CH_2CH_2CH_2O$—, —$CH_2CH(CH_3)O$— or —$CH_2CH(CH_2—CH_3)$—O—.

5. The dispersant as claimed in claim 1 wherein W is the residue independently derived from the group consisting of maleic acid, malonic acid, succinic and phthalic acid, maleic anhydride, glutaric anhydride, succinic anhydride and phthalic anhydride.

6. The dispersant as claimed in claim 1 wherein the group represented by Z is polyethyleneimine.

7. The composition as claimed in claim 2 wherein the organic medium is an organic liquid or a plastics material.

8. The composition as claimed in claim 2 wherein the organic liquid comprises at least 0.1% by weight of a polar organic liquid based on the total organic liquid.

9. The composition as claimed in claim 2 wherein the particulate solid is a pigment.

10. A composition as claimed in claim 2 in the form of a paint or ink, wherein said organic medium and/or water comprises an organic liquid.

11. A composition as claimed in claim 2 in the form of a mill-base, wherein said organic medium and/or water comprises an organic liquid.

12. A composition as claimed in claim 2, wherein Y is $C_{3-4}$-alkyleneoxy.

13. A composition as claimed in claim 2, wherein Y is $C_{3-4}$-alkyleneoxy and the chain represented by $(Y)_x$ is —$CH_2CH_2CH_2CH_2O$—, —$CH_2CH(CH_3)O$— or —$CH_2$—$CH(CH_2$—$CH_3)$—O—.

14. A composition as claimed in claim 2, wherein W is the residue independently derived from the group consisting of maleic acid, malonic acid, succinic and phthalic acid, maleic anhydride, glutaric anhydride, succinic anhydride and phthalic anhydride.

15. A composition as claimed in claim 2, wherein the group represented by Z is polyethyleneimine.

16. A dispersant as claimed in claim 1, wherein Z carries 2 or more groups E-O—$(Y)_x$-T-NR'-A- attached to Z and wherein the dispersant is represented by Formula (2)

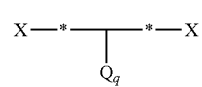

Formula (2)

wherein
X-*-*-X represents the polyamine and/or polyimine;
Q is the chain E-O—$(Y)_x$-T-NR'-A-; and
q is from 2 to 2000.

17. A dispersant as claimed in claim 1, wherein Z carries 2 or more groups E-O—$(Y)_x$-T-NR'-A- attached to Z and these may be the same or different as shown in Formula 2a

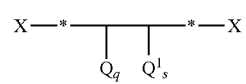

Formula 2a wherein
X-*-*-X represents the polyamine and/or polyimine;
Q is the chain E-O—$(Y)_x$-T-NR'-A-;
$Q^1$ represents a polyester and/or polyamide chain of formula $R^1$-G-$(M)_m$-;
$R^1$ is hydrogen or $C_{1-50}$- optionally substituted hydrocarbyl;
G is a divalent bond or carbonyl;
M is the residue of one or more amino carboxylic acids, one or more hydroxy carboxylic acids, one or more lactones of hydroxycarboxylic acids, or mixtures thereof;
q and s are positive integers greater than zero, in one embodiment q+s is from 2 to 2000; and
m is a positive integer from 2 to 100.

* * * * *